(12) United States Patent
Schlachter

(10) Patent No.: US 7,147,039 B2
(45) Date of Patent: Dec. 12, 2006

(54) AIR ROUTING DEVICE FOR A MOTOR VEHICLE AIR CONDITIONING OR HEATING SYSTEM

(75) Inventor: Claude Schlachter, Wolschwiller (FR)

(73) Assignee: Behr France S.A.R.L., Rouffach (FR)

( * ) Notice: Subject to any disclaimer, the term of this patent is extended or adjusted under 35 U.S.C. 154(b) by 0 days.

(21) Appl. No.: 11/031,347

(22) Filed: Jan. 10, 2005

(65) Prior Publication Data

US 2005/0170773 A1    Aug. 4, 2005

(30) Foreign Application Priority Data

Jan. 8, 2004    (EP)    ................... 04290057

(51) Int. Cl.
*F25B 29/00*    (2006.01)
*B60H 1/00*    (2006.01)
*B60H 3/00*    (2006.01)

(52) U.S. Cl. .................... 165/43; 165/42; 165/202; 165/76; 165/78; 165/137; 165/119; 454/156; 454/160; 454/161; 454/338; 55/282.2; 55/282.4; 55/282.5

(58) Field of Classification Search ................ 165/42, 165/43, 202, 76, 78, 137, 119; 454/338, 454/160, 156, 161; 55/282.2, 282.4, 282.5
See application file for complete search history.

(56) References Cited

U.S. PATENT DOCUMENTS 6,178,764 B1    1/2001  Tanaka et al.
2002/0104330 A1  8/2002  Klingler et al.

FOREIGN PATENT DOCUMENTS

| EP | 1 228 907 A2 | 8/2002 |
| FR | 2 789 018 A1 | 8/2000 |
| GB | 2290864 A * | 1/1996 |
| JP | 11001115 A * | 1/1999 |

* cited by examiner

*Primary Examiner*—John K. Ford
(74) *Attorney, Agent, or Firm*—Foley & Lardner LLP

(57) ABSTRACT

An air routing device for a motor vehicle air conditioning and/or heating system, comprising an air routing housing on which a blower is arranged, wherein the air routing device is formed separately from the air routing housing and can be pushed into the air routing housing through alternate housing orifices located opposite one another.

12 Claims, 4 Drawing Sheets

AIR ROUTING DEVICE FOR A MOTOR VEHICLE AIR CONDITIONING OR HEATING SYSTEM

CROSS-REFERENCE TO RELATED PATENT APPLICATIONS

The right of foreign priority is claimed under 35 U.S.C. § 119(a) based upon European Patent Application No. 04 290 057.1, filed Jan. 8, 2004, the entire content of which, including the specification, drawings, claims and abstract, is incorporated herein by reference.

BACKGROUND OF THE INVENTION

The present invention relates to a heating, ventilating or air conditioning system and, in particular, to an air routing device for a motor vehicle heating, ventilating or air conditioning system. Conventionally, as illustrated in FIGS. 3 and 4, different components must be employed in the case of asymmetrically designed air routing housings 1, e.g., air routing housings 1 constructed mirror-symmetrically are used for motor vehicles with left-hand and right-hand drive, respectively. Thus, FIG. 3 illustrates an air routing housing 1 for a motor vehicle air conditioning system having a blower 2, filter 3 and evaporator 4, designed for a motor vehicle with left-hand drive. In the deflection region of the air flow downstream of the blower 2 and upstream of the filter 3, an appropriately fluidically optimized profile, referred to below as an air routing device, is formed on the air routing housing 1, in order to optimize the air distribution over the entire filter surface. Owing to the different configuration of the air routing housings 1 for motor vehicles with left-hand and right-hand drive, the respective air routing device is also designed differently.

This leads to considerable extra costs, since, inter alia, tools for forming relatively large parts must be provided, and these must be available, in each case, for right-hand and left-hand drive vehicles.

SUMMARY OF THE INVENTION

One object of the present invention is to make available an improved and more cost-effective air routing device.

A further object of the invention is to provide an improved set of parts for manufacturing automobiles that differ by virtue of having their drive controls on the right side or, alternatively, on the left side.

It is also an object of the invention to provide an improved heating, ventilating or air conditioning system for a motor vehicle, as well as to provide vehicles embodying the improved system.

In accomplishing the objects of the invention, there has been provided, in accordance with one aspect of the invention a heating, ventilating or air conditioning system, comprising: a blower; an optional heating device; an optional evaporator; an air routing housing on which the blower is mounted; and, an air routing device, wherein the air routing device is a separate element from the air routing housing, and the air routing device is selectively mountable on the air routing housing in an orifice through an outer wall of the housing.

In accordance with another aspect of the invention, there has been provided a motor vehicle comprising a heating, ventilating or air-conditioning system, wherein the heating, ventilating or air-conditioning system comprises a system as defined above.

According to yet another aspect of the invention, there has been provided a set of parts that enables selective manufacturing of automobiles that differ by virtue of having their drive controls on the right side or, alternatively, on the left side, the set of parts comprising a blower; an optional heating device; an optional evaporator; an air routing housing on which the blower can be mounted; and an air routing device, wherein the air routing device is a separate element from the air routing housing, and the air routing device is selectively mountable on the air routing housing in a first orifice through an outer wall of the housing, and the blower is selectively mountable in a second orifice in the outer wall of the air routing housing on a side opposite of the first orifice.

Further objects, features and advantages of the present invention will become apparent from the detailed description of preferred embodiments that follows, when considered together with the accompanying figures of drawing.

BRIEF DESCRIPTION OF THE DRAWINGS

The invention is explained in detail below by means of an exemplary embodiment, with reference to the drawings, in which.

DETAILED DESCRIPTION OF PREFERRED EMBODIMENTS

Figure 1:
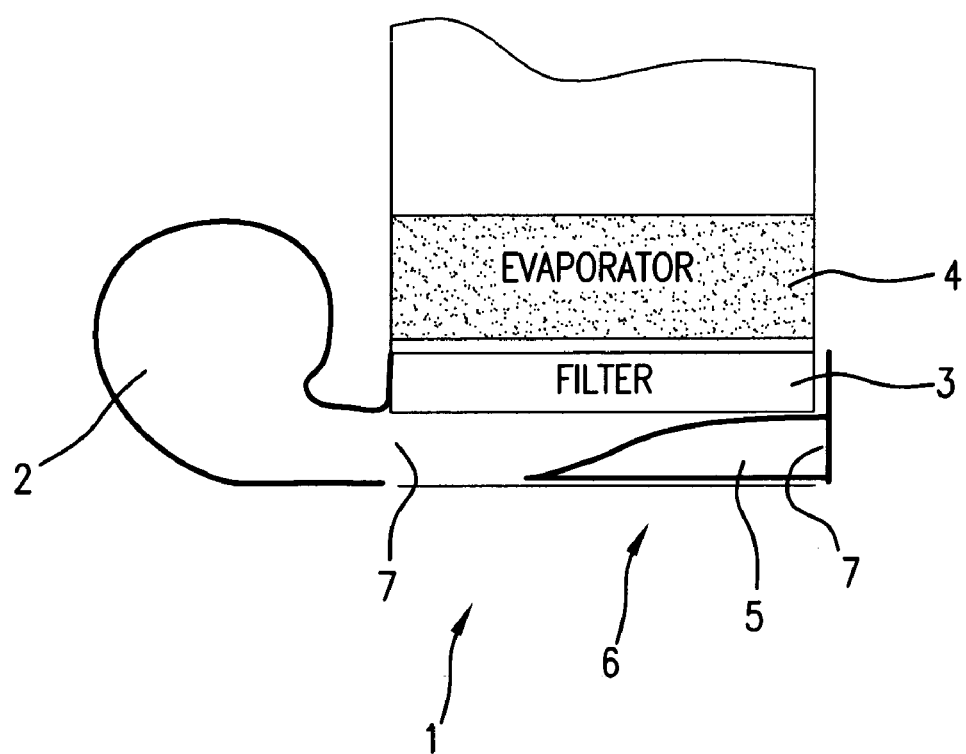
FIG. 1 is a diagrammatic cross-sectional view of an air routing device according to the invention, designed for a motor vehicle of the left-hand drive type.

According to the invention, there is provided an air routing device for a motor vehicle air conditioning or heating system, having an air routing housing on which a blower is arranged. The air routing device is formed separately from the air routing housing and is pushed into the air routing housing through a housing orifice located opposite a correspondingly formed housing orifice in which the blower is mounted. This makes it possible to have an identical configuration of the air routing housing for motor vehicles irrespective of whether they have left-hand or right-hand drive, so that the workpiece costs can be reduced and the required logistics can also be simplified.

The air routing device is preferably formed by a filter cover, designed so that the air routing device brings about a uniform air distribution to the filter that is arranged downstream of the air-routing device.

The air routing housing and the air routing device preferably have the same fastening arrangement as that provided on the opposite side for a blower. As a result, the fastening devices provided on the air routing housing can be used both for the blower and for the air routing device, as required, and there is no need for any additional fastening devices. Consequently, the same air routing housing (also in terms of possible machining operations which follow the injection molding) can be used for motor vehicles with left-hand and right-hand drive, respectively.

The air routing device is preferably designed mirror-symmetrically with respect to the midplane of the air routing housing, so that not only the same air routing housing, but also the same air routing device can be used for motor vehicles with left-hand and right-hand drive. Preferably, the air routing device has the same profile over the entire width in the air routing region.

Turning now to the drawings, an air routing housing 1 can be used for both motor vehicles having left-hand and also for those having right-hand drive, owing to an appropriately configured air routing device, which will be described in more detail below. The air routing housing, is designed in such a way that a blower 2 can be flanged to the air routing housing 1 selectively, i.e., on the left or on the right depending on the arrangement of the steering. For this purpose, housing orifices 7 located opposite one another are provided in the air routing housing 1. A filter 3 and one or more heat exchangers, in the present case an evaporator 4 and optionally a heater (not illustrated), are arranged so as to follow downstream of the blower 2, for the purpose of conditioning the air flowing through the heater/air-conditioning system.

In the deflection region of the air flow, which is located downstream of the blower 2 and upstream of the air filter 3, a filter cover 5 is provided which has an appropriately fluidically optimized profile and which serves the function of an air routing device 6. In this preferred embodiment, the filter cover 5 is pushed laterally through the housing orifice located opposite the blower 2, in order to optimize the air distribution over the entire filter surface and therefore to achieve as uniform of a utilization of the filter 3 as possible, and also to provide for a uniform air distribution over the downstream heat exchanger. Other modes of attaching the filter cover 5 are also possible, e.g., fastening over the end of the housing, or the like.

Figure 2:
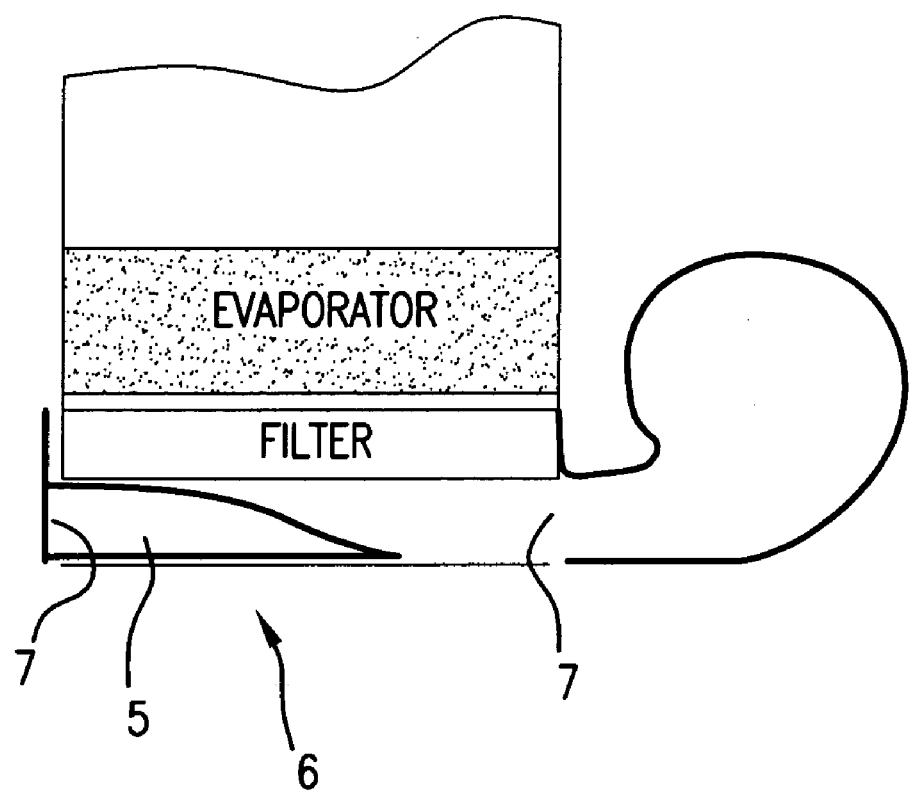
FIG. 2 is a diagrammatic cross-sectional view of an air routing device according to the invention, designed for a motor vehicle of the right-hand drive type.
Figure 3:
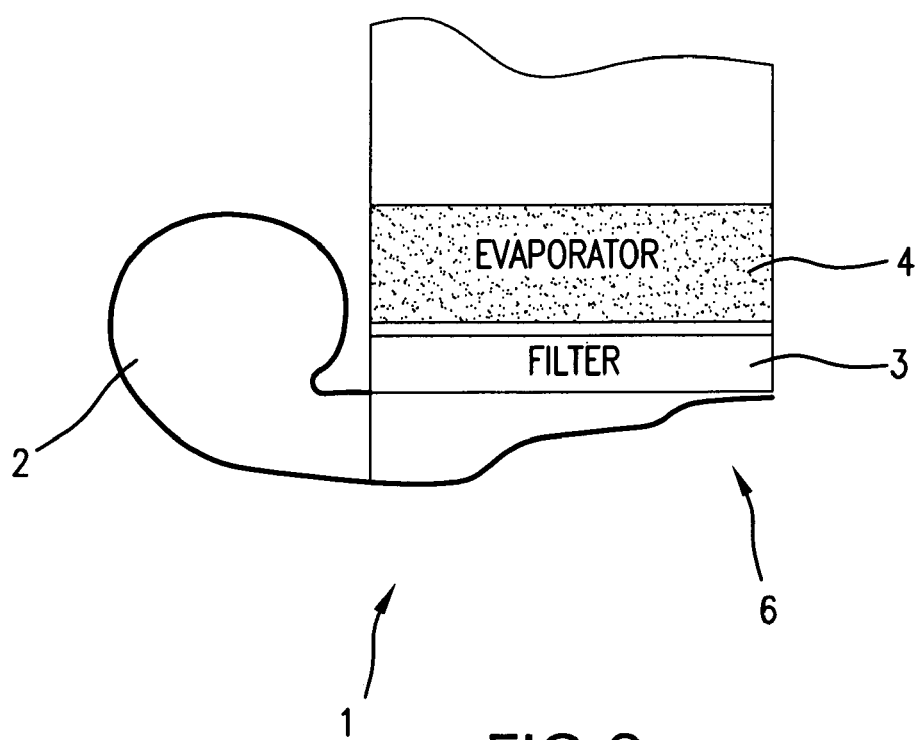
FIG. 3 is a diagrammatic cross-sectional view of a conventional air routing device, designed for a motor vehicle of the left-hand drive type.
Figure 4:
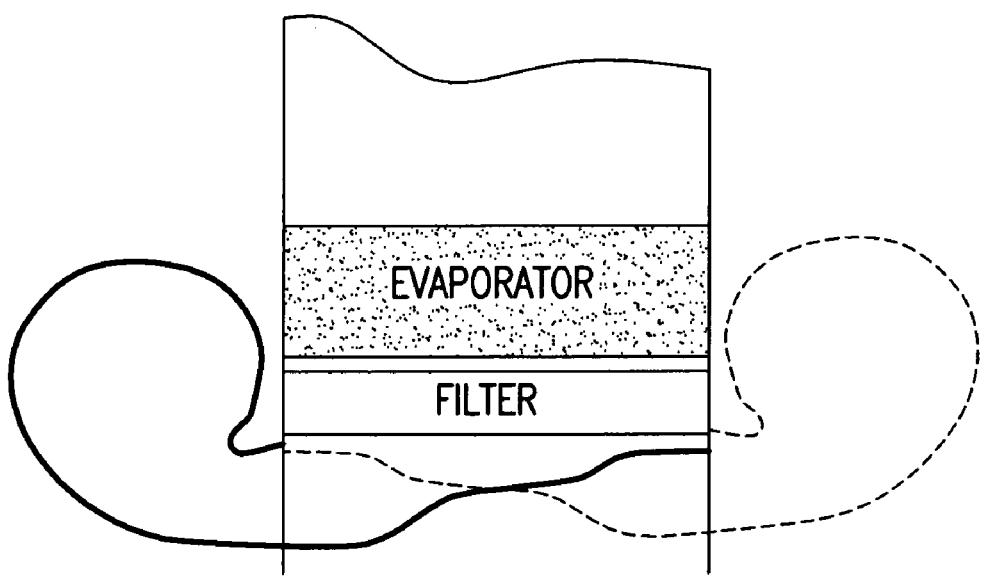
FIG. 4 is a diagrammatic cross-sectional view depicting two conventional air routing devices, for a motor vehicle in a joint illustration, with the air routing device for the motor vehicle with right-hand drive being illustrated by dashed lines.

For mounting on the air routing housing 1, the filter cover 5 has a configuration that can employ the same mounting device as the blower 2. As a result, both the blower and the filter cover are capable of being mounted on either side of the air guiding housing, to provide for the mirror-symmetrical design variant. Thus, there is no need for any additional devices for fastening to the air routing housing 1, and the same air routing housing 1 can be used for vehicles having both steering arrangements, respectively. Likewise, because of its symmetry in the present case, the filter cover 5 can be used for both steering arrangements, so that motor vehicles with left-hand and right-hand drive can be equipped with the same elements. Only the arrangement or placement of the blower 2 and filter cover 5 is different. In the present case, the filter cover 5 preferably has the same profile in the air routing region over its entire width, that is to say in the viewing direction of FIG. 1 or 2.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A heating, ventilating or air conditioning system, comprising:
    a blower for establishing an air flow direction;
    an air routing housing which extends from the blower in the airflow direction and on which the blower is mounted;
    an air routing device positioned in the air routing housing;
    a filter arranged so as to follow the air routing device, downstream in the air flow direction,
    wherein the air routing housing comprises two orifices located on opposite sides in the outer wall of the air routing housing with respect to one another for receiving the air routing device and for fastening the blower, respectively, wherein the air routing device is a separate element from the air routing housing and comprises a profile portion for providing uniform air distribution to the filter and a mounting portion that is configured for insertion from the outside, through and into either of said orifices to mount the air routing device and to cover the filter by closing the orifice into which the mounting portion is inserted, and wherein the air routing device is selectively mountable on the air routing housing in either of said orifices in the outer wall of the air routing housing.

2. A heating, ventilating or air conditioning system as claimed in claim 1, wherein the blower is mounted to the opposing one of said orifices from the orifice in which the air routing device is mounted.

3. A heating, ventilating or air conditioning system as claimed in claim 1, wherein the air routing device comprises a filter cover that comprises a three dimensional profile member that extends approximately to the midplane of the air routing housing between the two orifices.

4. A heating, ventilating or air conditioning system as claimed in claim 1, wherein the filter is arranged so as to follow the air routing device, downstream in the air flow direction.

5. A heating, ventilating or air conditioning system as claimed in claim 1, wherein the two opposite orifices in the air routing housing comprise a fastening device that enables selective fastening of both the blower and the air routing device.

6. A heating, ventilating or air conditioning system as claimed in claim 5, wherein both the blower and the air routing device comprise fastening members that interchangeably cooperate with the fastening devices on opposite sides of the air routing housing.

7. A heating, ventilating or air conditioning system as claimed in claim 1, wherein the air routing device is designed mirror-symmetrically with respect to the midplane of the air routing housing.

8. A heating, ventilating or air conditioning system as claimed in claim 1, wherein the air routing device has the same profile over the entire width in an air routing region.

9. A motor vehicle comprising a heating, ventilating or air-conditioning system, wherein the heating, ventilating or air-conditioning system comprises a system as defined by claim 1.

10. A heating, ventilating or air conditioning system as claimed in claim 1, further comprising a heating device positioned downstream from the filter.

11. A heating, ventilating or air conditioning system as claimed in claim 1, further comprising an evaporator positioned downstream from the filter.

12. A set of parts that enables selective manufacturing of automobiles that differ by virtue of having their drive controls on the right side or, alternatively, on the left side, the set of parts comprising
- a blower;
- a filter element:
- an air routing housing on which the blower can be mounted; and
- an air routing device, wherein the air routing housing comprises two orifices located on opposite sides in the outer wall of the air routing housing with respect to one another for receiving the air routing device and for fastening the blower, respectively, wherein the air routing device is a separate element from the air routing housing and comprises a profile portion for providing uniform air distribution to the filter and a mounting portion that is configured for insertion from the outside, through and into either of said orifices to mount the air routing device and to cover the filter by closing the orifice into which the mounting portion is inserted, and wherein the air routing device is selectively mountable on the air routing housing in either of said orifices in the outer wall of the housing, and the blower is selectively mountable to the opposing one of said orifices from the orifice in which the air routing device is mounted.

* * * * *